United States Patent
Liu et al.

(10) Patent No.: US 12,160,131 B2
(45) Date of Patent: Dec. 3, 2024

(54) BATTERY CHARGING APPARATUS AND METHOD THEREOF

(71) Applicant: NuVolta Technologies (Shanghai) Co., Ltd., Shanghai (CN)

(72) Inventors: Cheng Liu, Shanghai (CN); Fuchun Zhan, Shanghai (CN); Miaosong Wu, Shanghai (CN)

(73) Assignee: NuVolta Technologies (Shanghai) Co., Ltd., Shanghai (CN)

( * ) Notice: Subject to any disclaimer, the term of this patent is extended or adjusted under 35 U.S.C. 154(b) by 593 days.

(21) Appl. No.: 17/498,800

(22) Filed: Oct. 12, 2021

(65) Prior Publication Data

US 2023/0078732 A1     Mar. 16, 2023

(30) Foreign Application Priority Data

Sep. 15, 2021 (CN) .......................... 202111082324.0

(51) Int. Cl.
*H02J 7/00* (2006.01)
*H02M 3/07* (2006.01)

(52) U.S. Cl.
CPC ......... *H02J 7/007184* (2020.01); *H02M 3/07* (2013.01)

(58) Field of Classification Search
CPC ........................... H02M 3/07; H02J 7/007184
See application file for complete search history.

(56) References Cited

U.S. PATENT DOCUMENTS

| 2010/0123442 A1* | 5/2010 | Peterson | H02M 3/1588 323/282 |
| 2021/0194358 A1* | 6/2021 | Jing | H02M 1/36 |

* cited by examiner

*Primary Examiner* — Robert Grant
(74) *Attorney, Agent, or Firm* — AP3 Law Firm PLLC (57) ABSTRACT

A battery charging apparatus includes a first switch, a second switch, a third switch and a fourth switch connected in series between an input voltage bus and ground, wherein a common node of the second switch and the third switch is configured to be coupled to a battery, a flying capacitor connected between a common node of the first switch and the second switch, and a common node of the third switch and the fourth switch, and a controller configured to generate gate drive signals for configuring at least one switch of the first switch and the second switch as a linear regulator during a charging process of the battery.

20 Claims, 7 Drawing Sheets

BATTERY CHARGING APPARATUS AND METHOD THEREOF

PRIORITY CLAIM

This application claims priority to Chinese Patent Application No. 2021110823240, filed on Sep. 15, 2021, which is hereby incorporated by reference in its entirety.

TECHNICAL FIELD

The present invention relates to a battery charging apparatus and method, and, in particular embodiments, to a switched capacitor power converter based battery charging apparatus and method.

BACKGROUND

As technologies further advance, a variety of electronic devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the batteries. A battery charger is controlled to provide voltage (e.g., a constant voltage charging mode) and current (e.g., a constant current charging mode) to a battery so as to restore energy to the battery.

There may be a variety of power conversion topologies suitable for charging batteries. In accordance with the topology difference, the power conversion topologies can be divided into three categories, namely, switching power converters, linear regulators and switched-capacitor power converters. In comparison with other topologies, the switched-capacitor converters are less complicated because the switched-capacitor converters are formed by a plurality of switches and a flying capacitor. As a result, the switched-capacitor converters can provide compact and efficient power for charging batteries.

The battery charging process includes five charge stages, namely a trickle charge stage, a pre-charge stage, a constant current charge stage, a constant voltage charge stage and a termination charge stage. The trickle charge stage is employed when the battery is fully discharged (e.g., the battery voltage is less than 2 V for a single-cell battery). In the trickle charge stage, a constant current is fed into the battery, and the battery voltage gradually increases. The trickle charging current is in a range from about 20 mA to about 100 mA. Once the battery voltage reaches the pre-charge threshold (e.g., 2.2 V), the battery charger is configured to operate in the pre-charge stage. The pre-charge current is about one tenth of the constant charging current. In the pre-charge stage, the battery voltage keeps going up. Once the battery voltage exceeds the constant current charge threshold (e.g., 3.0 V), the battery charger is configured to operate in the constant current charge stage. The charging current is increased for constant current charging. In the constant current charge stage, the battery voltage gradually increases. For a single-cell battery, the battery voltage increases from about 3.0 V to about 4.2 V. Once the battery voltage reaches the constant voltage charge threshold (e.g., 4.2 V), the battery charger is configured to operate in the constant voltage charge stage. In the constant voltage charge stage, the charging current is gradually decreased. The battery voltage is kept at the constant voltage charge threshold. In the termination charge stage, the battery is almost full. The battery charger keeps running for a predetermined time until the battery charging process is complete.

In the constant voltage charge stage, the charge current starts from a large charge current and decreases to a small charge current. The battery voltage is kept constant. The constant voltage charge stage having a large charge current and the constant current charge stage may be collectively referred to as a fast charge stage.

In order to satisfy the five charge stages described above, a conventional battery charger has to include at least two power converters. For example, a switching charger and/or a linear regulator may be used to provide power for the trickle charge stage, the pre-charge charge stage, the constant voltage charge stage having a small charge current and the termination charge stage. A switched capacitor converter is used to provide power for the fast charge stage so as to achieve high efficiency. The battery charger having multiple power converters is not cost-effective. It would be desirable to have a simple and reliable battery charger to complete all five charge stages.

SUMMARY

These and other problems are generally solved or circumvented, and technical advantages are generally achieved, by preferred embodiments of the present disclosure which provide a battery charging apparatus and method.

In accordance with an embodiment, a battery charging apparatus comprises a first switch, a second switch, a third switch and a fourth switch connected in series between an input voltage bus and ground, wherein a common node of the second switch and the third switch is configured to be coupled to a battery, a flying capacitor connected between a common node of the first switch and the second switch, and a common node of the third switch and the fourth switch, and a controller configured to generate gate drive signals for configuring at least one switch of the first switch and the second switch as a linear regulator during a charging process of the battery.

In accordance with another embodiment, a method comprises coupling a power converter to a battery, wherein the power converter comprising a first switch, a second switch, a third switch and a fourth switch connected in series between an input voltage bus and ground, wherein a common node of the second switch and the third switch is configured to be coupled to the battery, and a flying capacitor connected between a common node of the first switch and the second switch, and a common node of the third switch and the fourth switch, and configuring at least one switch of the first switch and the second switch as a linear regulator during a process of charging the battery.

In accordance with yet another embodiment, a controller comprises a plurality of gate drivers configured to generate a plurality of gate drive signals for driving a switched capacitor power converter, wherein the switched capacitor power converter is configured to charge a battery, and during a process of charging the battery, the gate drive signals are configured so that at least one switch of the switched capacitor power converter is configured as a linear regulator.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a battery charging apparatus and method. The disclosure may also be applied, however, to a variety of power systems. Hereinafter, various embodiments will be explained in detail with reference to the accompanying drawings.

Figure 1:
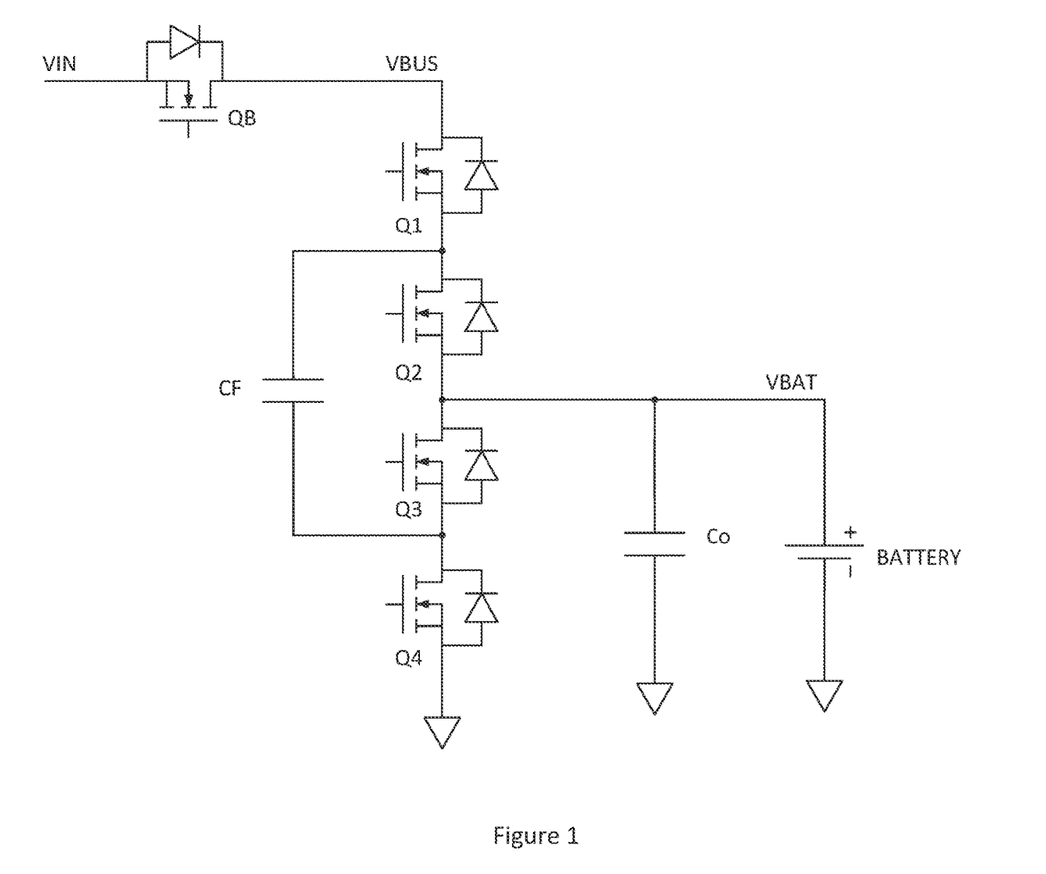
FIG. 1 illustrates a schematic diagram of a battery charging apparatus in accordance with various embodiments of the present disclosure.

FIG. 1 illustrates a schematic diagram of a battery charging apparatus in accordance with various embodiments of the present disclosure. The battery charging apparatus comprises a switched capacitor power converter configured to charge a battery. The switched capacitor power converter comprises a first switch Q1, a second switch Q2, a third switch Q3 and a fourth switch Q4 connected in series between an input voltage bus VBUS and ground. A flying capacitor CF is connected between a common node of Q1 and Q2, and a common node of Q3 and Q4. As shown in FIG. 1, a common node of Q2 and Q3 is connected to an output voltage bus VBAT. An output capacitor Co is connected between VBAT and ground. As shown in FIG. 1, a battery is coupled between the output voltage bus VBAT and ground.

For protecting the battery, the battery charging apparatus further comprises a switch QB connected between the input voltage bus VBUS and a power source bus VIN. A power source (not shown) is coupled to the power source bus VIN. The power source is configured to provide power for charging the battery. As shown in FIG. 1, the switch QB is an N-type transistor. A drain of QB is connected to VBUS. A source of the QB is connected to VIN. The switch is able to provide reverse blocking capability to isolate the battery from various system elements coupled to VIN.

A controller (not shown but illustrated in FIG. 7) is configured to generate gate drive signals for switches Q1-Q4 and QB. Furthermore, the controller is configured to control the operation of each switch based on a plurality of operating parameters and operating modes. Furthermore, the controller is configured to generate gate drive signals for configuring at least one switch of the first switch Q1 and the second switch Q2 as a linear regulator during a charging process of the battery. The detailed operation principle of the controller will be described below with respect to FIGS. 2-7.

In accordance with an embodiment, the switches of FIG. 1 (e.g., switches Q1-Q4 and QB) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 1 shows the switches Q1-Q4 and QB are implemented as single n-type transistors, a person skilled in the art would recognize there may be many variations, modifications and alternatives. For example, depending on different applications and design needs, at least some of the switches Q1-Q4 may be implemented as p-type transistors. QB may be implemented as two back-to-back connected transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

In operation, the switched-capacitor power converter may be configured to provide a small charge current for satisfying the requirements of various charge stages including the trickle charge stage, the pre-charge stage, the constant voltage charge stage having a small charge current and the termination charge stage. In this configuration, at least one switch of the switched-capacitor power converter is configured as a linear regulator so as to control the current flowing through the battery.

In some embodiments, the battery charging apparatus is configured to provide a small charge current (e.g., 20 mA in the trickle charge stage). The power loss in the linear regulator is not significant. Accordingly, one switch of the switched capacitor power converter is configured as a linear regulator. In some embodiments, Q1 may be configured as the linear regulator. The detailed operating principle of this system configuration will be discussed below with respect to FIG. 2. In alternative embodiments, Q2 may be configured as the linear regulator. The detailed operating principle of this system configuration will be discussed below with respect to FIG. 3.

In some embodiments, the battery charging apparatus is configured to provide a relatively large charge current (e.g., a few hundred mA in the constant voltage charge stage). The power loss in one linear regulator may cause excessive heat, thereby creating a reliability issue. In order to avoid the excessive heat generated in one linear regulator, two switches (e.g., Q1 and Q2) may be configured as linear regulators.

In some embodiments, Q1 is configured as a first linear regulator, and Q2 is configured as a second linear regulator. These two linear regulators are connected in series. The voltage/current regulation of the battery is carried out through operating these two linear regulators simultaneously. In order to achieve better thermal performance, the voltage drops on these linear regulators are dynamically adjusted so as to achieve a uniform temperature distribution across these two linear regulators. For example, the controller may detect the temperatures of Q1 and Q2 respectively. Based on the detected temperatures, the controller may reduce the gate drive voltage of the switch having a low temperature, thereby increasing the power loss in the switch having the low temperature. On the other hand, the controller may increase the gate drive voltage of the switch having a high temperature, thereby reducing the power loss in the switch having the high temperature. By using this control mechanism, Q1 and Q2 can achieve a uniform temperature distribution.

In some embodiments, configuring Q1 as the first linear regulator and configuring Q2 as the second linear regulator are carried out in an alternating manner. More particularly, the controller may detect the temperatures of Q1 and Q2 respectively. When the temperature of Q1 exceeds a predetermined temperature threshold, the controller configures Q1 to leave the linear regulator mode and operate as an always-on switch, and configures Q2 as a linear regulator. Likewise, when the temperature of Q2 exceeds a predetermined temperature threshold, the controller configures Q2 to leave the linear regulator mode and operate as an always-on switch, and configures Q1 as a linear regulator. By using this control mechanism, Q1 and Q2 are configured as linear regulators in an alternating manner.

In operation, in the fast charge stage of the battery charging process, the switched capacitor power converter may be configured to operate in a charge pump mode for achieving high efficiency. In the charge pump mode, the switched capacitor power converter functions as a voltage divider. More particularly, the output voltage of the switched capacitor power converter is equal to one half of the input voltage. The detailed operating principle of the charge pump mode will be discussed below with respect to FIG. 5.

Figure 2:
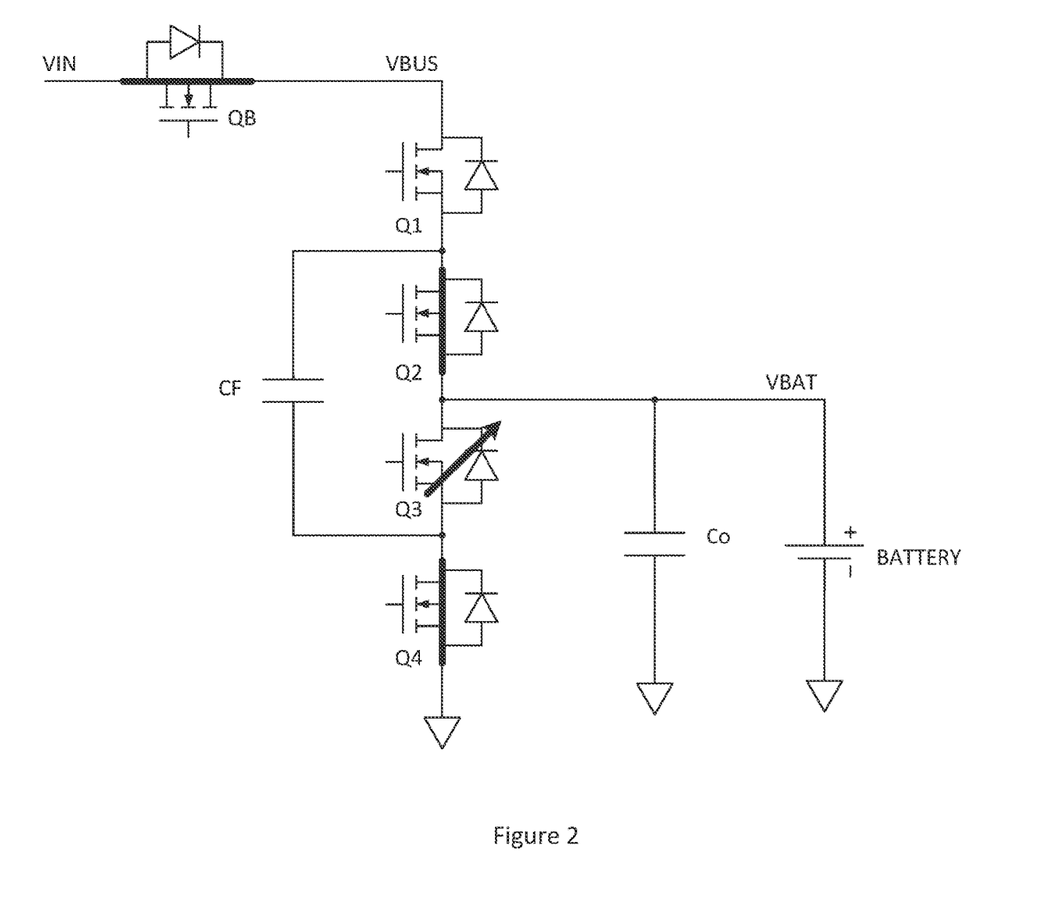
FIG. 2 illustrates a first implementation of configuring one switch of the battery charging apparatus as a linear regulator in accordance with various embodiments of the present disclosure.

FIG. 2 illustrates a first implementation of configuring one switch of the battery charging apparatus as a linear regulator in accordance with various embodiments of the present disclosure. In order to satisfy the requirements of various charge stages, one switch of the battery charging apparatus shown in FIG. 1 is configured as a linear regulator. In some embodiments, the linear regulator is a low dropout (LDO) regulator. As shown in FIG. 2, the switches QB, Q2, Q4 are fully turned on as indicated by the thick black lines on their symbols. In this system configuration, Q2 is configured as a first always-on switch. Q4 is configured as a second always-on switch. The switch Q3 is turned off as indicated by the arrow on its symbol. In this system configuration, the switch Q3 functions as an always-off switch. Q1 is configured as the linear regulator.

In operation, the turned on QB, Q2 and the linear regulator (Q1) establish a conductive path from the power source coupled to VIN and the battery. The power source is configured to provide power for charging the battery. The charge current and the voltage applied to the battery are controlled and regulated through controlling the operation of the linear regulator (Q1).

Figure 3:
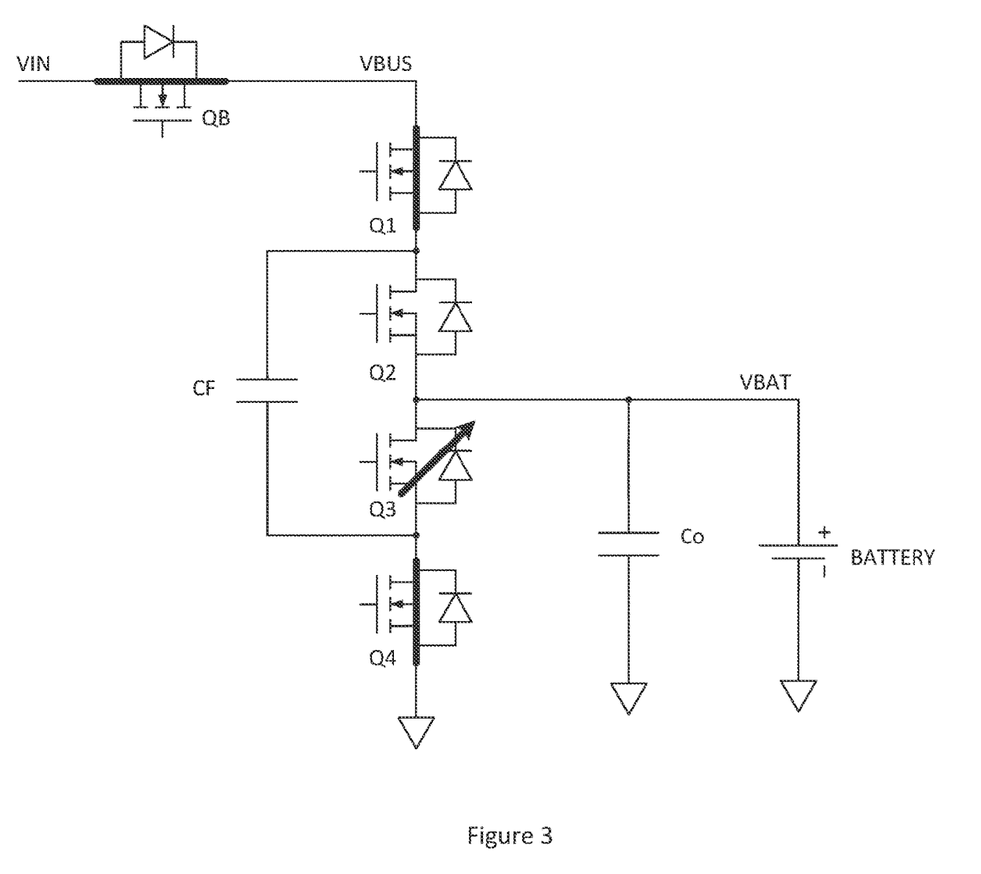
FIG. 3 illustrates a second implementation of configuring one switch of the battery charging apparatus as a linear regulator in accordance with various embodiments of the present disclosure.

FIG. 3 illustrates a second implementation of configuring one switch of the battery charging apparatus as a linear regulator in accordance with various embodiments of the present disclosure. The second implementation shown in FIG. 3 is similar to the first implementation shown in FIG. 2 except that Q2 is configured as a linear regulator. As shown in FIG. 3, the switches QB, Q1, Q4 are fully turned on as indicated by the thick black lines on their symbols. In this system configuration, Q1 is configured as a first always-on switch. Q4 is configured as a second always-on switch. The switch Q3 is turned off as indicated by the arrow on its symbol. In this system configuration, Q3 functions as an always-off switch.

In operation, the turned on QB, Q1 and the linear regulator (Q2) establish a conductive path from the power source coupled to VIN and the battery. The power source is configured to provide power for charging the battery. The charge current and the voltage applied to the battery are controlled and regulated through controlling the operation of the linear regulator (Q2).

Figure 4:
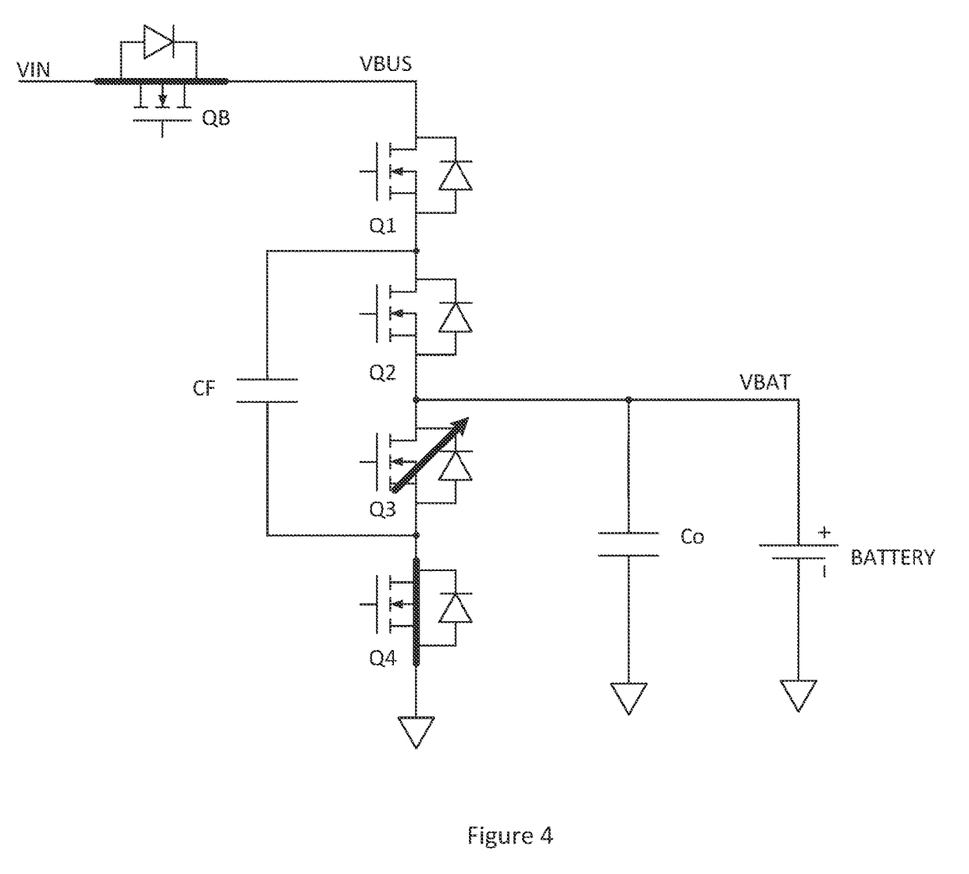
FIG. 4 illustrates an implementation of configuring two switches of the battery charging apparatus as linear regulators in accordance with various embodiments of the present disclosure.

FIG. 4 illustrates an implementation of configuring two switches of the battery charging apparatus as linear regulators in accordance with various embodiments of the present disclosure. In order to satisfy the requirements of various charge stages, two switches of the battery charging apparatus shown in FIG. 1 are configured as linear regulators. Q1 is configured as a first linear regulator. Q2 is configured as a second linear regulator. As shown in FIG. 4, the switches QB, Q4 are fully turned on as indicated by the thick black lines on their symbols. In this system configuration, Q4 is configured as an always-on switch. The switch Q3 is turned off as indicated by the arrow on its symbol. In this system configuration, Q3 functions as an always-off switch.

In operation, the turned on QB, the first linear regulator (Q1) and the second linear regulator (Q2) establish a conductive path from the power source coupled to VIN and the battery. The power source is configured to provide power for charging the battery. The charge current and the voltage applied to the battery are controlled and regulated through controlling the operation of the linear regulators (Q1 and Q2).

In some embodiments, configuring Q1 as the first linear regulator and configuring Q2 as the second linear regulator are carried out simultaneously. In alternative embodiments, configuring Q1 as the first linear regulator and configuring Q2 as the second linear regulator are carried out in an alternating manner. Furthermore, the controller is configured to detect temperatures of Q1 and Q2, and configure Q1 as a first linear regulator and Q2 as a second linear regulator in a dynamic manner based on the temperatures of Q1 and Q2.

Figure 5:
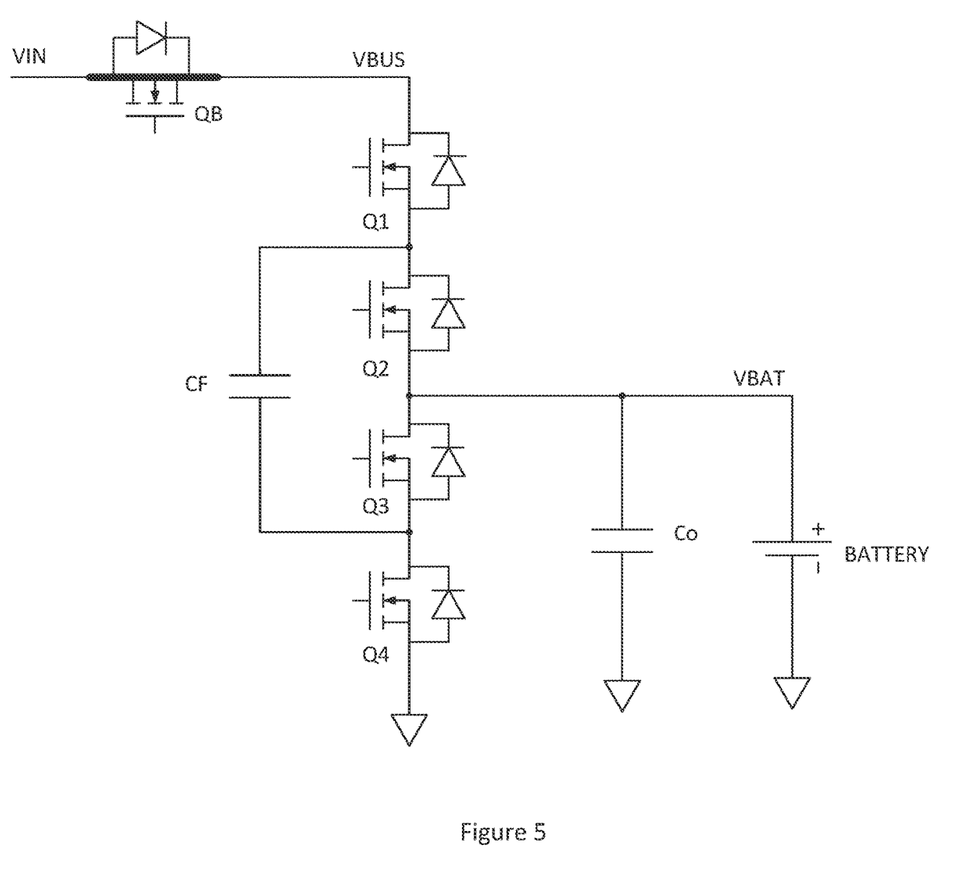
FIG. 5 illustrates an implementation of configuring the battery charging apparatus shown in FIG. 1 to operate in the charge pump mode in accordance with various embodiments of the present disclosure.

FIG. 5 illustrates an implementation of configuring the battery charging apparatus shown in FIG. 1 to operate in the charge pump mode in accordance with various embodiments of the present disclosure. In order to achieve high efficiency in the fast charge stage of the battery charging process, the switched capacitor converter is configured to operate in the charge pump mode. As shown in FIG. 5, the switch QB is fully turned on as indicated by the thick black line on its symbol. The controller is configured to control the turn-on and turn-off of Q1-Q4 based on the operating principle of the charge pump mode. In the charge pump mode, the switched capacitor converter functions as a voltage divider. More particularly, the output voltage of the switched capacitor converter is equal to one half of the input voltage.

In the charge pump mode, the switched capacitor power converter is configured to operate in two different phases. During a first phase, Q1 and Q3 are turned on, and Q2 and Q4 are turned off. Since Q1 and Q3 are turned on, a first conductive path is established between VBUS and VBAT. The first conductive path is formed by switch Q1, the flying capacitor CF and switch Q3. The current flows from VBUS to VBAT through the first conductive path. During the first phase, the flying capacitor CF is charged and energy is stored in the flying capacitor CF accordingly.

During a second phase, Q1 and Q3 are turned off, and Q2 and Q4 are turned on. Since Q2 and Q4 are turned on, a second conductive path is established. The second conductive path is formed by switch Q4, the flying capacitor CF and switch Q2. During the second phase, the current discharges the flying capacitor CF and the energy stored in the flying capacitor CF decreases accordingly.

Figure 6:
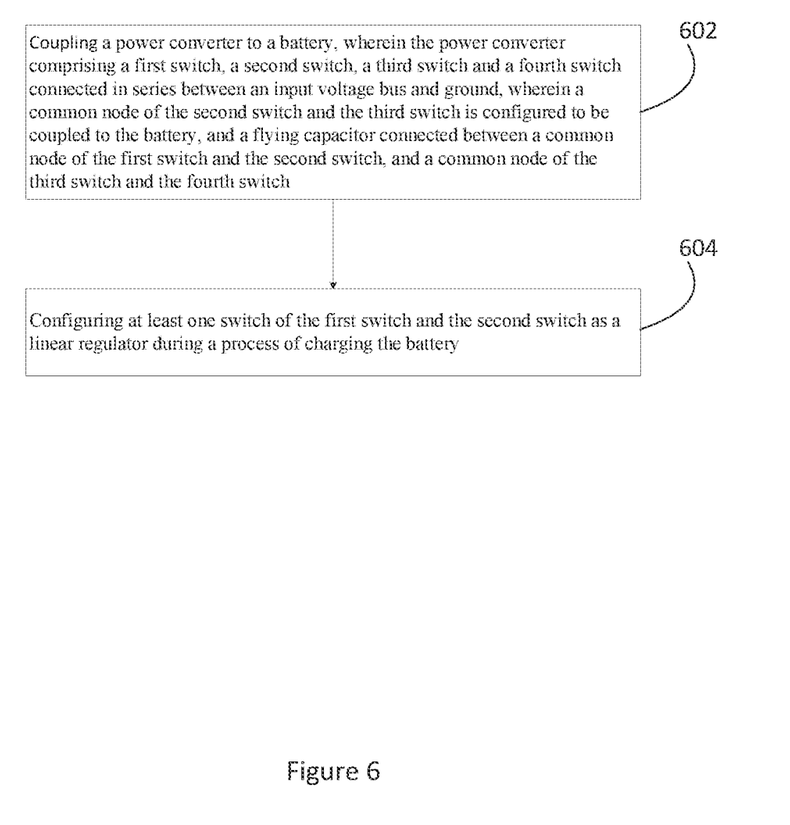
FIG. 6 illustrates a flow chart of controlling the battery charging apparatus shown in FIG. 1 in accordance with various embodiments of the present disclosure.

FIG. 6 illustrates a flow chart of controlling the battery charging apparatus shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

Referring back to FIG. 1, the switched capacitor power converter comprises a first switch, a second switch, a third switch and a fourth switch connected in series between an input voltage bus and ground. A common node of the second switch and the third switch is configured to be coupled to a battery. A flying capacitor is connected between a common node of the first switch and the second switch, and a common node of the third switch and the fourth switch.

At step 602, the switched capacitor power converter is coupled to the battery. The input of the switched capacitor power converter is connected to a power source through a switch. The output of the switched capacitor power converter is connected to the battery.

At step 604, at least one switch of the first switch and the second switch is configured as a linear regulator during a process of charging the battery. The linear regulator is employed to regulate the current flowing through the battery as well as the voltage across the battery.

The method further comprises in a trickle charge stage of the process of charging the battery, configuring the at least one switch of the first switch and the second switch as the linear regulator to charge the battery.

The method further comprises in a pre-charge stage of the process of charging the battery, configuring the at least one switch of the first switch and the second switch as the linear regulator to charge the battery.

The method further comprises in a portion of a constant voltage charge stage of the process of charging the battery, configuring the at least one switch of the first switch and the second switch as the linear regulator to charge the battery.

The method further comprises in a termination charge stage of the process of charging the battery, configuring the at least one switch of the first switch and the second switch as the linear regulator to charge the battery.

The method further comprises in a fast charge stage of the process of charging the battery, configuring the power converter to operate in a charge pump mode. The fast charge stage of the process of charging the battery includes a large current portion of the constant voltage charge stage and the constant current charge stage.

Referring back to FIG. 2, the method further comprises during the process of charging the battery, configuring the first switch as the linear regulator, configuring the second switch as a first always-on switch, configuring the third switch as an always-off switch, and configuring the fourth switch as a second always-on switch.

Referring back to FIG. 3, during the process of charging the battery, configuring the first switch as a first always-on switch, configuring the second switch as the linear regulator, configuring the third switch as an always-off switch, and configuring the fourth switch as a second always-on switch.

Referring back to FIG. 4, during the process of charging the battery, configuring the first switch as a first linear regulator, configuring the second switch as a second linear regulator, configuring the third switch as an always-off switch, and configuring the fourth switch as an always-on switch.

Figure 7:
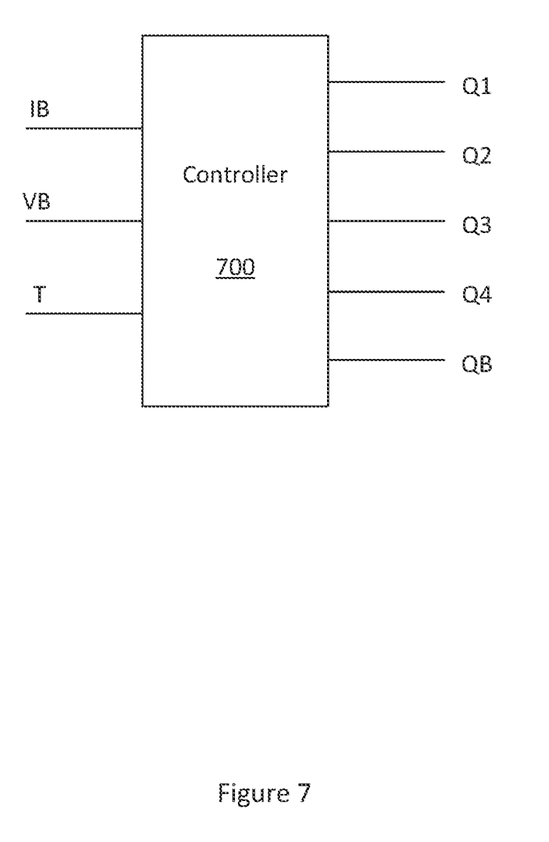
FIG. 7 illustrates a controller for driving the switches of the battery charging apparatus shown in FIG. 1 in accordance with various embodiments of the present disclosure.

FIG. 7 illustrates a controller for driving the switches of the battery charging apparatus shown in FIG. 1 in accordance with various embodiments of the present disclosure. The controller 700 comprises five gate drivers and a plurality of signal processing devices for processing various operating parameters such as a current (TB) flowing through the battery, a voltage (VB) across the battery, and temperatures (T) on the packages of the switches (Q1-Q4 and QB).

A first gate driver is configured to generate a first gate drive signal applied to the gate of Q1. A second gate driver is configured to generate a second gate drive signal applied to the gate of Q2. A third gate driver is configured to generate a third gate drive signal applied to the gate of Q3. A fourth gate driver is configured to generate a fourth gate drive signal applied to the gate of Q4. A fifth gate driver is configured to generate a fifth gate drive signal applied to the gate of QB.

In operation, the first gate driver is configured to apply the first gate drive signal to the gate of Q1 so that Q1 functions as a linear regulator during various charge stages of the battery charging process. Likewise, the second gate driver is configured to apply the second gate drive signal to the gate of Q2 so that Q2 functions as a linear regulator during various charge stages of the battery charging process.

Furthermore, the first gate driver and the second gate driver are coordinated such that both Q1 and Q2 function as linear regulators. These two linear regulators are running simultaneously. In some embodiments, the voltage drops on these two linear regulators are dynamically adjusted so as to achieve a uniform temperature distribution across these two linear regulators. The controller 700 may detect the temperatures of Q1 and Q2 respectively. In some embodiments, the temperature of Q1 is lower than the temperature of Q2. In response to this temperature relationship, the controller 700 may reduce the gate drive voltage of Q1 and increase the gate drive voltage of Q2, thereby increasing the power loss in Q1 and reducing the power loss in Q2. On the other hand, when the temperature of Q1 is higher than the temperature of Q2, the controller 700 may reduce the gate drive voltage of Q2 and increase the gate drive voltage of Q1, thereby increasing the power loss in Q2 and reducing the power loss in Q1. By using this control mechanism, Q1 and Q2 can achieve a uniform temperature distribution.

In some embodiments, the first gate driver and the second gate driver are coordinated such that Q1 and Q2 are configured as linear regulators in an alternating manner. For example, the controller 700 may detect the temperatures of Q1 and Q2 respectively. When the temperature of Q1 exceeds a predetermined temperature threshold, the controller 700 configures Q1 as an always-on switch, and configures Q2 as a linear regulator. Likewise, when the temperature of Q2 exceeds a predetermined temperature threshold, the controller 700 configures Q2 as an always-on switch, and configures Q1 as a linear regulator. By using this control mechanism, Q1 and Q2 are configured as linear regulators in an alternating manner.

It should be noted that the controller 700 having five gate drivers described above is merely an example, which should not unduly limit the scope of the claims. One of ordinary skill in the art would recognize many variations, alternatives, and modifications. For example, external gate drivers may be used to further improve the drive capability.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A battery charging apparatus comprising:
a first switch, a second switch, a third switch and a fourth switch connected in series between an input voltage bus and ground, wherein a common node of the second switch and the third switch is configured to be coupled to a battery;
a flying capacitor connected between a common node of the first switch and the second switch, and a common node of the third switch and the fourth switch; and
a controller configured to generate gate drive signals for configuring at least one switch of the first switch and the second switch as a linear regulator during a charging process of the battery, wherein when the at least one switch of the first switch and the second switch is configured as the linear regulator, the third switch is configured as an always-off switch, and the fourth switch is configured as an always-on switch.

2. The battery charging apparatus of claim 1, wherein:
the first switch is configured as the linear regulator;
the second switch is configured as a first always-on switch;
the third switch is configured as the always-off switch; and
the fourth switch is configured as a second always-on switch.

3. The battery charging apparatus of claim 1, wherein:
the first switch is configured as a first always-on switch;
the second switch is configured as the linear regulator;
the third switch is configured as the always-off switch; and
the fourth switch is configured as a second always-on switch.

4. The battery charging apparatus of claim 1, wherein:
the first switch is configured as a first linear regulator;
the second switch is configured as a second linear regulator;
the third switch is configured as the always-off switch; and
the fourth switch is configured as the always-on switch.

5. The battery charging apparatus of claim 4, wherein:
configuring the first switch as the first linear regulator and configuring the second switch as the second linear regulator are carried out simultaneously.

6. The battery charging apparatus of claim 4, wherein:
configuring the first switch as the first linear regulator and configuring the second switch as the second linear regulator are carried out in an alternating manner.

7. The battery charging apparatus of claim 1, further comprising:
a switch connected between the input voltage bus and a power source, wherein the switch is configured to be fully turned on during the charging process of the battery.

8. The battery charging apparatus of claim 1, wherein:
the controller is configured to detect temperatures of the first switch and the second switch, and configure the first switch as a first linear regulator and the second switch as a second linear regulator in a dynamic manner based on the temperatures of the first switch and the second switch.

9. A method comprising:
coupling a power converter to a battery, wherein the power converter comprising:
a first switch, a second switch, a third switch and a fourth switch connected in series between an input voltage bus and ground, wherein a common node of the second switch and the third switch is configured to be coupled to the battery; and
a flying capacitor connected between a common node of the first switch and the second switch, and a common node of the third switch and the fourth switch; and
configuring at least one switch of the first switch and the second switch as a linear regulator during a process of charging the battery, wherein when the at least one switch of the first switch and the second switch is configured as the linear regulator, the third switch is configured as an always-off switch, and the fourth switch is configured as an always-on switch.

10. The method of claim 9, further comprising:
in a trickle charge stage and a pre-charge stage of the process of charging the battery, configuring the at least one switch of the first switch and the second switch as the linear regulator to charge the battery.

11. The method of claim 9, further comprising:
in a small current portion of a constant voltage charge stage of the process of charging the battery, configuring the at least one switch of the first switch and the second switch as the linear regulator to charge the battery.

12. The method of claim 9, further comprising:
in a termination charge stage of the process of charging the battery, configuring the at least one switch of the first switch and the second switch as the linear regulator to charge the battery.

13. The method of claim 9, further comprising:
in a fast charge process of the battery, configuring the power converter to operate in a charge pump mode.

14. The method of claim 13, wherein:
the fast charge process of the battery includes a large current portion of a constant voltage charge stage and a constant current charge stage.

15. The method of claim 9, further comprising:
during the process of charging the battery, configuring the first switch as the linear regulator, configuring the second switch as a first always-on switch, configuring the third switch as the always-off switch, and configuring the fourth switch as a second always-on switch.

16. The method of claim 9, further comprising:
during the process of charging the battery, configuring the first switch as a first always-on switch, configuring the second switch as the linear regulator, configuring the third switch as the always-off switch, and configuring the fourth switch as a second always-on switch.

17. The method of claim 9, further comprising:
during the process of charging the battery, configuring the first switch as a first linear regulator, configuring the second switch as a second linear regulator, configuring the third switch as the always-off switch, and configuring the fourth switch as the always-on switch.

18. A controller comprising:
a plurality of gate drivers configured to generate a plurality of gate drive signals for driving a switched capacitor power converter, wherein:
the switched capacitor power converter is configured to charge a battery; and
during a process of charging the battery, the gate drive signals are configured so that at least one switch of the switched capacitor power converter is configured as a linear regulator, wherein when the at least one switch of the switched capacitor power converter is configured as the linear regulator, a first lower switch of the switched capacitor power converter is configured as an always-off switch, and a second lower switch of the switched capacitor power converter is configured as an always-on switch.

19. The controller of claim 18, wherein the switched capacitor power converter comprises:
a first switch, a second switch, a third switch and a fourth switch connected in series between an input voltage bus and ground, wherein a common node of the second switch and the third switch is configured to be coupled to the battery, wherein the third switch is the first lower switch of the switched capacitor power converter, and the fourth switch is the second lower switch of the switched capacitor power converter; and
a flying capacitor connected between a common node of the first switch and the second switch, and a common node of the third switch and the fourth switch.

20. The controller of claim 19, wherein:
the at least one switch is one of the first switch and the second switch.

* * * * *